United States Patent [19]
Taylor

[11] Patent Number: 5,170,152
[45] Date of Patent: Dec. 8, 1992

[54] LUMINANCE BALANCED ENCODER

[75] Inventor: Gary L. Taylor, Fort Collins, Colo.

[73] Assignee: Hewlett-Packard Company, Palo Alto, Calif.

[21] Appl. No.: 628,286

[22] Filed: Dec. 14, 1990

[51] Int. Cl.[5] .......................... G09G 1/16; H04N 1/46
[52] U.S. Cl. ..................................... 340/703; 340/800; 340/728; 358/21 R; 358/80
[58] Field of Search ............... 340/703, 701, 728, 793; 358/31, 12, 22, 32, 75, 80, 13 C, 21 R; 382/51

[56] References Cited

U.S. PATENT DOCUMENTS

| | | | |
|---|---|---|---|
| 4,686,520 | 8/1987 | Yamaoka | 340/703 |
| 4,719,503 | 1/1988 | Craver et al. | 340/703 |
| 4,725,828 | 2/1988 | Cowlishaw | 340/703 |
| 4,733,230 | 3/1988 | Kurihara et al. | 340/728 |
| 4,789,854 | 12/1988 | Ishii | 358/22 |
| 4,847,683 | 7/1989 | Lang | 358/31 |
| 4,866,514 | 9/1989 | Yeomans | 358/80 |
| 4,956,638 | 9/1990 | Larky et al. | 340/701 |
| 5,012,163 | 4/1991 | Alcorn et al. | 358/32 |

Primary Examiner—Alvin E. Oberley
Assistant Examiner—Steve Saras
Attorney, Agent, or Firm—Guy J. Kelley

[57] ABSTRACT

A color encoder for reducing visible artifacts even when the values of the respective color signals are truncated during encoding. Since the human eye is most sensitive to luminance variations in the displayed image, luminance errors (and hence visible artifacts) are minimized by adding red and green color error signals to the blue color intensity signal prior to encoding so that luminance detail may be maintained. The blue channel is chosen for this purpose since the human eye is least sensitive to changes in blue and yellow. The color maps for the resulting encoded signals may be scaled such that the red and green values are raised and/or the blue values lowered so as to maintain the same relative intensity of luminance in the displayed image. Errors in the displayed luminance signal may thus be made up to four times smaller without increasing the amount of memory required and without adding expensive processing circuitry.

25 Claims, 3 Drawing Sheets

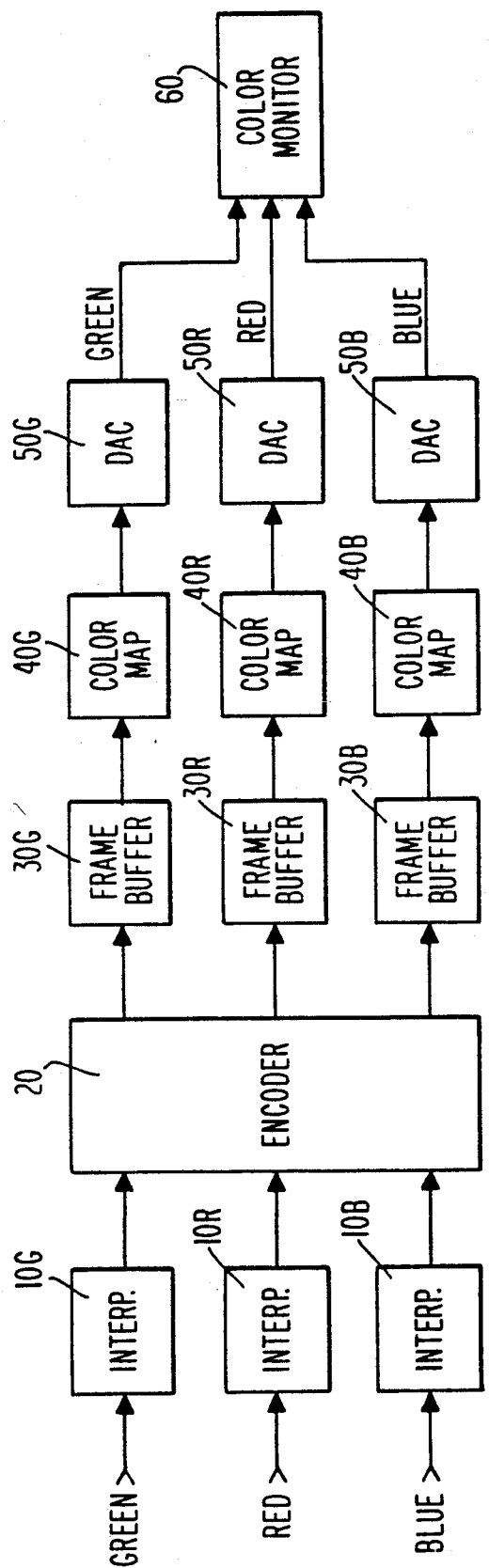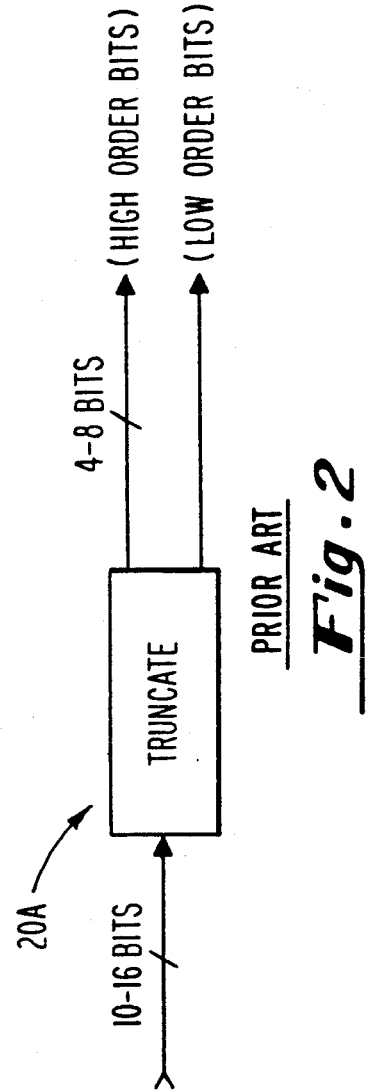
PRIOR ART
Fig. 1
PRIOR ART
Fig. 2

LUMINANCE BALANCED ENCODER

BACKGROUND OF THE INVENTION

1. Field Of The Invention

The present invention relates to a system and method for encoding color signals while minimizing visible artifacts in the displayed image, and more particularly, to a system and method for jointly encoding the respective color intensity signals so as to minimize visible artifacts, particularly those caused by errors in the luminance signal due to the color signal encoding.

2. Description Of The Prior Art

Color encoders are widely used in computer graphics and color television display systems for encoding the color signals to be displayed on the display screen. FIG. 1 illustrates a simplified prior art computer graphics display system in which the respective green, red and blue digitized color signals are respectively interpolated by interpolation circuits 10G, 10R and 10B for computing the color values at the respective pixels of the display device. These interpolated values are then input into an encoder 20 where they are separately encoded for storage in respective frame buffers 30G, 30R and 30B. In some display systems, these encoded color values are then used as indices into color look-up tables or color maps 40G, 40R and 40B for determining the actual color to be displayed on the display screen. The resulting color values read from the color maps 40G, 40R and 40B are then converted to analog voltages by respective digital to analog converters 50G, 50R and 50B, and these analog voltages are applied to a color monitor 60 for driving the electron guns of the color monitor 60 in accordance with known techniques.

A very simple prior art encoder for use as encoder 20 in the computer graphics display system described above with respect to FIG. 1 is represented as 20A in FIG. 2. Such a prior art encoder 20A simply truncates an input color intensity signal having a predetermined number of digital bits (typically 10-16 bits) to a lesser number of high order bits (typically 4-8 bits), and these high order bits are then stored as the encoded values in the respective frame buffers 30G, 30R and 30B. The low order bits are generally discarded. A truncation circuit 20A is generally provided in each color channel to separately truncate the respective color values (R, G and B). Such a simple color encoder has the benefits that it is easy to implement and minimizes memory usage in the frame buffers. However, by so limiting the encoded values to the high order bits, the accuracy of the encoded color values is adversely affected.

FIG. 3 illustrates another prior art encoder 20B for use as encoder 20 in the computer graphics display system of FIG. 1. The circuit of FIG. 3 improves the color resolution by utilizing dithered encoding of each of the color values separately. This technique has the benefit that although the encoded output signal is limited to a predetermined number of high order bits (N), the encoded output signal has an average of N+2 bits of color accuracy. This is accomplished by taking the high order N bits of the input color fraction signal (R, G or B) and applying it to an adder 30 along with dither bits N+1 and N+2. These dither bits are added to the least significant bits of the X and Y pixel addresses for determining dither values which are added to the high order N bits in adder 30. The summed values thus change as the pixel addresses change from one point to the next. The low order bits of the input color fraction signal are generally discarded (as in the case of truncation), and the useful output fraction of the adder 30 is limited to the dithered N bits. When dither encoding each color value separately in such an embodiment, the input intensity value must be scaled not to exceed all ones in the output fraction so that adder 30 will not overflow. Such an embodiment is beneficial because when a constant colored region is so encoded, groups of four adjacent pixels will average N+2 bits of color accuracy rather than N bits as for the encoder 20A of FIG. 2.

However, besides their inherent limitation in color accuracy because of their truncation of the input color intensity values, the prior art encoders 20A and 20B of FIGS. 2 and 3 have another major limitation. Namely, by discarding the low order bits for each of the color intensity signals, visible artifacts are introduced into the displayed image. These artifacts generally occur in the luminance (Y) signal, which, as known to those skilled in the art, is a weighted sum of the red, green and blue color intensity signals and is typically represented as a fraction having a value between 0 and 1. If the luminance signal has a value of 1, it represents a fully saturated white, while if the luminance signal has a value less than 1, some other color is represented. Since the luminance signal is comprised of fractional portions of the red, green and blue signals, it is adversely affected by the truncation of each of these color signals during encoding. Such effects on the luminance signal are very undesirable, for the human eye is more sensitive to changes in the luminance values of a displayed image than changes in the color intensity signals. Accordingly, such discarding of lower order bit information for each of the color signals adversely affects the luminance detail of the image displayed, thereby causing visible artifacts noticeable to the viewer.

Accordingly, it is desired to develop an encoding system and method for use in a computer color graphics or color television display system whereby the visible artifacts introduced into the displayed image by the encoding of the color intensity signals are minimized without unduly increasing system cost. The present invention has been designed to solve this problem.

SUMMARY OF THE INVENTION

The present invention solves the afore-mentioned problem in the prior art by maintaining the detail of the luminance information during encoding of the respective color intensity signals. This is preferably accomplished in accordance with the invention by taking the discarded lower order bits of one or more of the encoded color intensity signals, scaling these signals so as to maintain the luminance value substantially constant, and adding the scaled signals to another input intensity signal before it is encoded. The blue intensity signal is preferably chosen as the signal to which the red and green color information is added in a preferred embodiment since the human eye is least sensitive to blue intensity changes; however, the same adjustments may be made in the red, green or other color intensity signals as desired.

In accordance with the invention, a color encoder is provided for encoding respective color intensity signals for each pixel to be displayed on a video display unit. Such an encoder in accordance with the invention preferably comprises means for separately encoding the respective color intensity signals for each pixel of the video display unit and means for adjusting, prior to encoding, the intensities of the respective color intensity signals at each pixel in accordance with the intensities of the other respective color intensity signals for that pixel so as to minimize visible luminance artifacts in the displayed image as a result of the encoding of each pixel by the encoding means. Generally, such visible artifacts are measured by luminance errors in the displayed image as a result of the encoding by the encoding means. The adjusting means compensates for these luminance errors by adjusting the intensities of the respective color intensity signals prior to encoding.

In a preferred embodiment of the invention, means are provided for dividing the respective color intensity signals for each pixel into first signals having a predetermined number of bits and error signals and outputting the first signals as encoded color intensity signals. Means responsive to an error signal of at least one of the respective color intensity signals for a pixel is also provided for combining the at least one error signal with a different one of the respective color intensity signals for that pixel before it is divided by the dividing means. This enables an adjusted color intensity signal for that pixel to be obtained which is then divided by the dividing means to obtain an output with reduced visible luminance artifacts.

In accordance with other preferred embodiments of the invention, the dividing means comprises a truncation circuit for each of the color intensity signals, where each truncation circuit truncates an input color intensity signal to the predetermined number of bits. On the other hand, the dividing means may comprise a dithering circuit for each of the color intensity signals which adds a predetermined number of dither bits from an input color intensity signal to the predetermined number of bits of the input color intensity signal before the sum is limited to the predetermined number of bits output as the encoded color intensity signals. The combining means may also comprise scaling means for scaling the at least one error signal and a summer for adding the scaled at least one error signal to the different one of the color intensity signals before it is input into the dividing means.

In a particular embodiment, the at least one error signal comprises Green and Red error signals and the different one of the color intensity signals comprises a Blue signal, while the scaling means respectively scales the Green error signal by a value approximately equal to $C_G/C_B$ and the Red error signal by a value approximately equal to $C_R/C_B$, where $C_G$, $C_R$ and $C_B$ are determined from the luminance equation $Y = C_G \cdot G + C_R \cdot R + C_B \cdot B$. In the particular embodiment, $C_G/C_B$ may be approximated by 5 and $C_R/C_B$ may be approximated by 2.5 to simplify the scaling circuitry. A bias towards Blue as a result of such scaling may be compensated by adjusting the values stored in the color look-up tables storing the color information.

The scope of the invention also includes a color graphics system for displaying respective color intensity signals for each pixel a video display unit. Such a color graphics system in accordance with the invention preferably comprises means for calculating the respective color intensity signals for each pixel of the video display unit and means for encoding the respective color intensity signals at each pixel of the video display unit in accordance with the intensities of the other respective color intensity signals for that pixel so as to minimize visible luminance artifacts in a displayed image as a result of encoding. The graphics system of the invention thus minimizes visible luminance artifacts in the displayed image by combining an error signal of at least one of the respective color intensity signals for a pixel with a different one of the respective color intensity signals for that pixel prior to outputting the respective encoded color intensity signals. Such a system also comprises memory means for storing encoded outputs of the encoding means and color look-up means for converting the encoded outputs to color intensity signals for display on the video display unit. In addition, a bias towards any of the color intensity signals as a result of the scaling may be offset by adjusting the values stored in the color look-up means.

The scope of the invention further includes a method of encoding respective color intensity signals for each pixel to be displayed on a video display unit. Such a method in accordance with the invention preferably comprises the steps of separately encoding the respective color intensity signals for each pixel of the video display unit and adjusting, prior to encoding, the intensities of the respective color intensity signals at each pixel in accordance with the intensities of the other respective color intensity signals for that pixel so as to minimize visible luminance artifacts in the displayed image as a result of the encoding of each pixel in the encoding step. Such visible luminance artifacts are measured by luminance errors in the displayed image as a result of the encoding in the encoding step, and these luminance errors are compensated for in the adjusting step by adjusting the intensities of the respective color intensity signals prior to encoding.

In accordance with a preferred embodiment of the method of the invention, the adjusting step comprises the steps of separately precomputing the intensity values of the respective encoded color intensity signals for each pixel to be displayed, calculating respective error signals for each pixel introduced by the encoding step, adjusting the intensities of the respective color intensity signals at each pixel in accordance with the intensities of the other respective color intensity signals for that pixel so as to minimize visible artifacts in the displayed image as a result of the respective error signals and inputting the adjusted color intensity signals into encoding means for performing the encoding step. The color intensity signals are preferably adjusted in the adjusting step by adjusting one color intensity signal for each pixel by an amount which offsets the error signals of the other color intensity signals for that pixel, thereby reducing the error in the luminance value of the displayed image as a result of the error signals.

In accordance with the preferred method of the invention, the encoding step comprises the step of dividing the respective color intensity signals for each pixel into first signals having a predetermined number of bits and error signals, while the adjusting step preferably includes the step of separately combining at each pixel at least one error signal of the respective color intensity signals for a pixel with a different one of the respective color intensity signals for that pixel before it is divided in the dividing step, thereby obtaining an adjusted color intensity signal which is divided in the dividing step. The first signals are then output as the encoded color intensity signals with reduced visible luminance artifacts.

In accordance with preferred embodiments of the method of the invention, the dividing step comprises the step of truncating an input color intensity signal to the predetermined number of bits. On the other hand, the dividing step may comprise the steps of adding a predetermined number of dither bits from an input color intensity signal to the predetermined number of bits of the input color intensity signal and then limiting the sum to the predetermined number of bits output as the encoded color intensity signals. In addition, the combining step may comprise the steps of scaling the at least one error signal and adding the scaled at least one error signal to the different one of the color intensity signals before it is divided in the dividing step.

In a particular embodiment of the method of the invention, the at least one error signal may comprise Green and Red error signals and the different one of the color intensity signals may comprise a Blue signal, where the Green error signal is scaled in the scaling step by a value approximately equal to $C_G/C_B$ and the Red error signal is scaled in the scaling step by a value approximately equal to $C_R/C_B$, where $C_G$, $C_R$ and $C_B$ are determined from the luminance equation $Y = C_G \cdot G + C_R \cdot R + C_B \cdot B$. In this particular embodiment, $C_G/C_B$ may be approximated by 5 and $C_R/C_B$ may be approximated by 2.5 in the scaling step so as to simplify the scaling circuitry.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which:

FIG. 1 illustrates a prior art computer graphics display system having an encoder for separately encoding respective color values for subsequent display on a color monitor.

FIG. 2 illustrates a simple prior art encoder which separately truncates the respective input color intensity values before storing these values in the frame buffers of the computer graphics display system.

DETAILED DESCRIPTION OF THE PRESENTLY PREFERRED EXEMPLARY EMBODIMENT

A luminance balanced encoder with the above-mentioned beneficial features in accordance with a presently preferred exemplary embodiment of the invention will now be described with reference to FIGS. 4 and 5. It will be appreciated by those of ordinary skill in the art that the description given herein is for exemplary purposes only and is not intended in any way to limit the scope of the invention. All questions regarding the scope of the invention may be resolved by referring to the appended claims.

Figure 3:
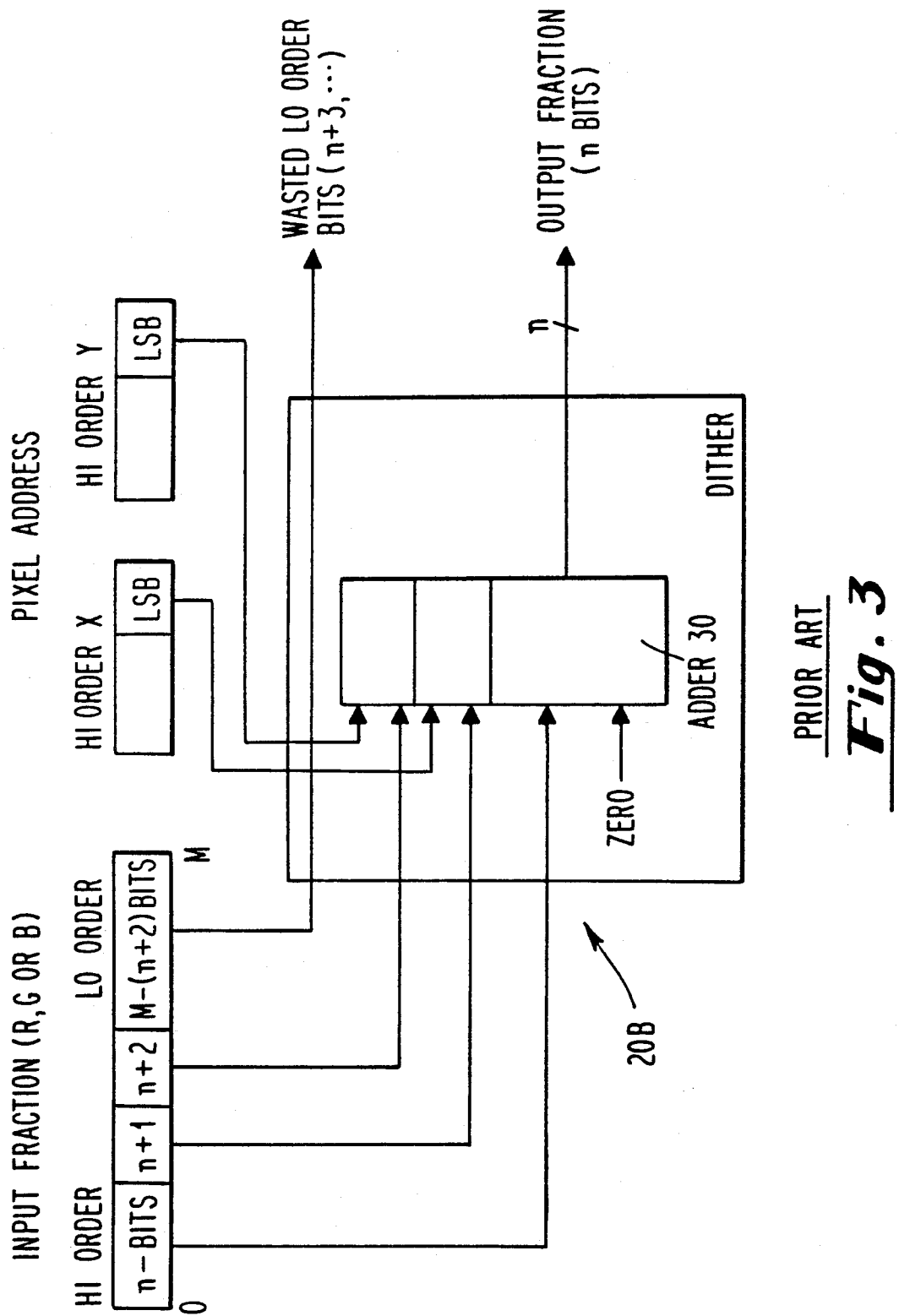
FIG. 3 illustrates a dithering encoder of the prior art in which dithering is used to improve the apparent resolution of the encoded color signal.
Figure 4:
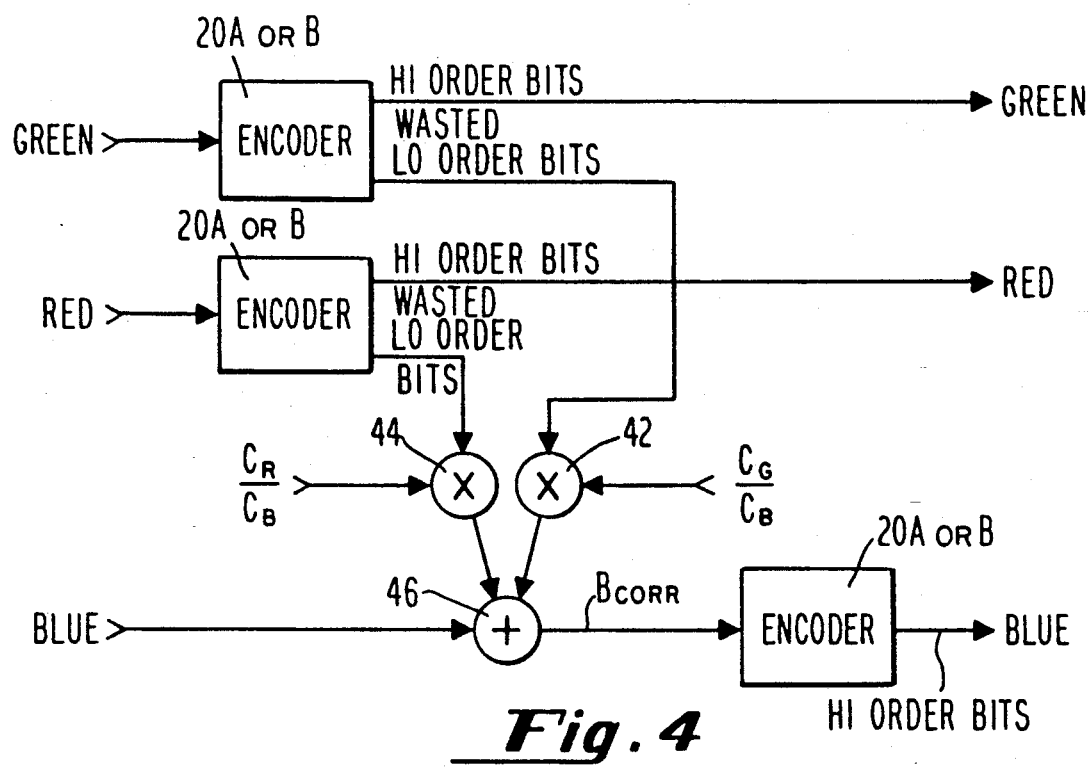
FIG. 4 illustrates a color encoder for encoding respective color intensity signals while minimizing visible artifacts in accordance with the invention.

FIG. 4 illustrates a preferred embodiment of a luminance balanced encoder in accordance with the present invention. As shown, encoders 20A of the type described above with respect to FIG. 2 or encoders 20B of the type described above with respect to FIG. 3 are placed in each of the color channels as in the prior art. Of course, other data compression techniques and encoders such as non-linear gamma correcting encoders of the type described in U.S. application Ser. No. 07/495,235 to Alcorn et al. and assigned to the present Assignee may also be used. However, the present invention distinguishes from all such prior art encoders in that the low order bits of the green and red color intensity signals are scaled in respective scaling circuits 42 and 44 and then added to the blue color intensity signal at adder 46 before the blue color intensity signal is encoded using such standard encoders. Such an arrangement in accordance with the invention functions to sum scaled corrections for the green and red truncation error into the blue intensity signal before it is encoded, thereby maintaining the accuracy of the luminance information and hence reducing visible artifacts in the displayed image.

Figure 5:
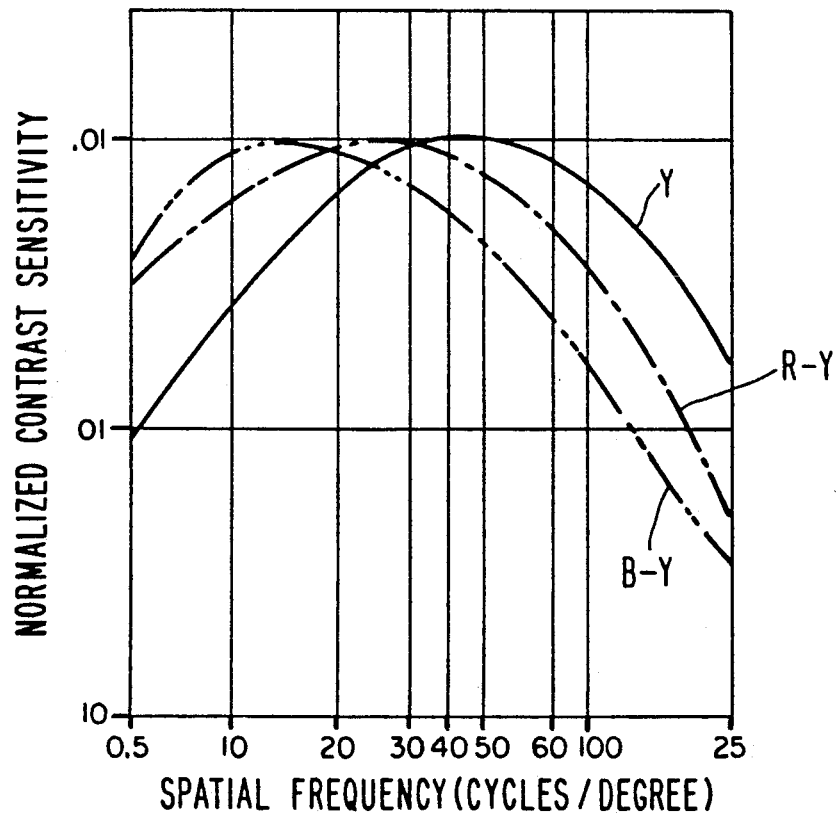
FIG. 5 illustrates normalized modulation transfer functions showing the increased sensitivity of the human eye to luminance intensities versus that of red and blue color difference intensities.

The red and green error is added in the preferred embodiment into the blue color intensity signal since the human eye is least sensitive to blue and yellow as shown by way of normalized modulation transfer functions in FIG. 5. In other words, since the blue color intensity signal adds the least to the intensity, any errors introduced by truncation of the blue color intensity signal adds the least error to the luminance signal. Any resulting bias towards blue introduced by the technique of the invention can be offset by appropriately adjusting the values stored in the color maps described above with respect to FIG. 1. Moreover, when combined with dithering encoders of the type described above with respect to FIG. 3, the technique of the invention further improves image quality while further reducing the bias to blue.

The theory behind the invention is quite straightforward. Since, the human eye is most sensitive to luminance intensity, accuracy of the luminance information is maintained during encoding. As known to those skilled in the art, the luminance Y is the intensity or brightness of the displayed image and is defined by the equation:

$$Y = C_G \cdot G + C_R \cdot R + C_B \cdot B, \quad (1)$$

where G, R and B are the green, red and blue fractional values of the color intensity and luminance Y is described as a fractional value between 0 and 1. The vector encoding error introduced by the encoders of the type described above with respect to FIGS. 2 and 3 may be described as the sum of the three color component errors $E_G$, $E_R$ and $E_B$, where the vector encoding error E is described as:

$$E = E_G + E_R + E_B. \quad (2)$$

Hence, the most visible error as a result of the encoding is the luminance error $Y_E$, which is given by the equation:

$$Y_E = C_G \cdot E_G + C_R \cdot E_R + C_B \cdot E_B. \quad (3)$$

This error is minimized in accordance with the invention by adding scaled green and red errors to the blue color intensity signal prior to encoding. In other words, the input blue color intensity value is luminance corrected prior to encoding, where the luminance corrected blue color intensity value $B_{CORR}$ is equal to:

$$B_{CORR} = B + C_G/C_B \cdot E_G + C_R/C_B \cdot E_R. \quad (4)$$

Since the signs of the error signals are defined by $E = E_{Desired} - E_{Encoded}$, when the error signals $E_G$ or $E_R$ are added to the blue input color intensity signal they offset the encoding error in green or red respectively. Equation (4) is implemented in the circuit of FIG. 4 by inputting the scaling values $C_G/C_B$ into scaling device 42 and $C_R/C_B$ into scaling device 44 prior to addition to the blue color intensity signal at adder 46 as shown.

As is known to those skilled in the art, the aforementioned values for $C_G$, $C_R$ and $C_B$ may be determined from the known equation for luminance $Y = 0.299R + 0.587G + 0.114B$. Hence $C_R = 0.299$, $C_G = 0.587$ and $C_B = 0.114$ and the exact values of $C_G/C_B$ and $C_R/C_B$ may be readily determined. However, as an implementation economy, the value of $C_G/C_B$ may be approximated by 5 and $C_R/C_B$ may be approximated by 2.5 so that a multiplier is not required in scaling devices 42 and 44. In other words, $B_{CORR}$ may be defined as:

$$B_{CORR} = [(E_G + 0.5 \cdot E_R) + 4(E_G + 0.5 \cdot E_R)] + B. \quad (5)$$

These values are easily implemented by shifting the bit fields left and using multiple adders rather than multipliers as scaling devices 42 and 44. Accordingly, the scaling circuitry may be kept quite simple, fast and inexpensive. In fact, a single adder may be used as scaling device 42 for a crude approximation where $C_G/C_B$ is approximated by 4 and $C_R/C_B$ is approximated by 0.

As noted above, by adding green and red color information to the blue color intensity signal, the resulting image on the display screen may be given a bluish cast. This may be compensated for by scaling down the blue colors in the color maps and/or by scaling up the green and red in the color maps such that the result is the same relative intensity of the colors making up the luminance signal. Similarly, the output may also be calibrated to compensate for the bluish cast on the image. Also, by using a dithering encoder to vary the pixel intensities, the intensity of a group of 4 pixels may be optimized such that the resulting luminance errors in the displayed image are up to four times smaller. This may be accomplished without increasing the amount of memory required for use as the frame buffers and without adding expensive processing circuitry.

Although a single exemplary embodiment of the invention has been described in detail above, those skilled in the art will readily appreciate that many additional modifications are possible in the exemplary embodiment without materially departing from the novel teachings and advantages of the invention. For example, color difference signals may be used in place of the red, green and blue signals, and the blue color intensity signal need not be the only color intensity signal with its input value luminance corrected. The input color intensity values of the red and green intensity signals may be similarly adjusted. However, since the human eye perceives differences in these colors more readily than the blue intensity signals, luminance correction in the blue color channel is presently preferred. Accordingly, all such modifications are intended to be included within the scope of this invention as defined in the following claims.

I claim:

1. A color encoder for encoding respective color intensity signals for each pixel to be displayed on a video display unit, comprising:
   means for separately encoding the respective color intensity signals for each pixel of said video display unit; and
   means for adjusting, prior to encoding by said encoding means, the intensities of the respective color intensity signals at each pixel in accordance with the intensities of the other respective color intensity signals for that pixel so as to minimize visible luminance artifacts in the displayed image as a result of the encoding of each pixel by said encoding means.

2. A color encoder for encoding respective color intensity signals for each pixel to be displayed on a video display unit, comprising:
   means for dividing said respective color intensity signals for each pixel into first signals having a predetermined number of bits and error signals, said first signals being output as encoded color intensity signals; and
   means responsive to an error signal of at least one of said respective color intensity signals for a pixel for combining said at least one error signal with a different one of said respective color intensity signals for said pixel before it is divided by said dividing means, thereby obtaining an adjusted color intensity signal for said pixel which is divided by said dividing means.

3. An encoder as in claim 2, wherein said dividing means comprises a truncation circuit for each of said color intensity signals which truncates an input color intensity signal to said predetermined number of bits.

4. An encoder as in claim 2, wherein said dividing means comprises a dithering circuit for each of said color intensity signals which adds a predetermined number of dither bits from an input color intensity signal to aid predetermined number of bits of said input color intensity signal before limiting the sum to said predetermined number of bits output as said encoded color intensity signals.

5. An encoder as in claim 2, wherein said combining means comprises scaling means for scaling said at least one error signal and a summer for adding the scaled at least one error signal to said different one of said color intensity signals before it is input into said dividing means.

6. An encoder as in claim 5, wherein said at least one error signal comprises Green and Red error signals and said different one of said color intensity signals comprises a Blue signal, said scaling means respectively scaling said Green error signal by a value approximately equal to $C_G/C_B$ and said Red error signal by a value approximately equal to $C_R/C_B$, where $C_G$, $C_R$ and $C_B$ are determined from the luminance equation $Y = C_G \cdot G + C_R \cdot R + C_B \cdot B$.

7. An encoder as in claim 6, wherein $C_G/C_B$ is approximated by 5 and $C_R/C_B$ is approximated by 2.5.

8. A color graphics system for displaying respective color intensity signals for each pixel of a video display unit, comprising:
   means for calculating said respective color intensity signals for each pixel said video display unit;
   means for encoding said respective color intensity signals at each pixel of said video display unit in accordance with the intensities of the other respective color intensity signals for that pixel so as to minimize visible luminance artifacts in a displayed image as a result of encoding, whereby an error signal of at least one of said respective color intensity signals for a pixel is combined with a different one of said respective color intensity signals for said pixel prior to outputting the respective encoded color intensity signals;

memory means for storing the encoded outputs of said encoding means; and color look-up means for converting said encoded outputs to color intensity signals for display on said video display unit.

9. A system as in claim 8, wherein said encoding means comprises a truncation circuit for each of said color intensity signals which truncates an input color intensity signal to a predetermined number of bits.

10. A system as in claim 8, wherein said encoding means comprises a dithering circuit for each of said color intensity signals which adds a predetermined number of dither bits from an input color intensity signal to a predetermined number of bits of said input color intensity signal before limiting the sum to said predetermined number of bits output as said encoded color intensity signals.

11. A system as in claim 8, wherein said encoding means comprises combining means for scaling said at least one error signal and for adding the scaled at least one error signal to said different one of said color intensity signals before it is encoded.

12. A system as in claim 11, wherein said at least one error signal comprises Green and Red error signals and said different one of said color intensity signals comprises a Blue signal, said combining means respectively scaling said Green error signal by a value approximately equal to $C_G/C_B$ and said Red error signal by a value approximately equal to $C_R/C_B$, where $C_G$, $C_R$ and $C_B$ are determined from the luminance equation $Y = C_G \cdot G + C_R \cdot R + C_B \cdot B$.

13. A system as in claim 12, wherein $C_G/C_B$ is approximated by 5 and $C_R/C_B$ is approximated by 2.5.

14. A system as in claim 12, wherein a bias towards Blue as a result of said scaling is offset by adjusting the values stored in said color look-up means to compensate said bias.

15. A method of encoding respective color intensity signals for each pixel to be displayed on a video display unit, comprising the steps of:

separately encoding the respective color intensity signals for each pixel of said video display unit; and adjusting, prior to said encoding step, the intensities of the respective color intensity signals at each pixel in accordance with the intensities of the other respective color intensity signals for that pixel so as to minimize visible luminance artifacts in the displayed image as a result of the encoding of each pixel in said encoding step.

16. A method as in claim 15, wherein said adjusting step comprises the steps of:

separately precomputing the intensity values of the respective encoded color intensity signals for each pixel to be displayed;

calculating respective error signals for each pixel introduced by said encoding step;

adjusting the intensities of the respective color intensity signals at each pixel in accordance with the intensities of the other respective color intensity signals for that pixel so as to minimize visible luminance artifacts in the displayed image as a result of the respective error signals; and inputting said adjusted color intensity signals into encoding means for performing said encoding step.

17. A method as in claim 16, wherein said color intensity signals are adjusted in said adjusting step by adjusting one color intensity signal for a pixel by an amount which offsets the error signals of the other color intensity signals for said pixel, thereby reducing the error in the luminance value of the displayed image as a result of the error signals.

18. A method as in claim 16, wherein said encoding step comprises the step of truncating the input color intensity signals.

19. A method as in claim 16, wherein said encoding step comprises the step of dithering the input color intensity signals during encoding.

20. A method of encoding respective color intensity signals for each pixel to be displayed on a video display unit, comprising the steps of:

dividing said respective color intensity signals for each pixel of said video display unit into first signals having a predetermined number of bits and error signals;

separately combining at each pixel of said video display unit at least one error signal of said respective color intensity signals for a pixel with a different one of said respective color intensity signals for said pixel before it is divided in said dividing step, thereby obtaining an adjusted color intensity signal; and outputting said first signals as encoded color intensity signals.

21. A method as in claim 20, wherein said dividing step comprises the step of truncating an input color intensity signal to said predetermined number of bits.

22. A method as in claim 20, wherein said dividing step comprises the steps of adding a predetermined number of dither bits from an input color intensity signal to said predetermined number of bits of said input color intensity signal and then limiting the sum to said predetermined number of bits output as said encoded color intensity signals.

23. A method as in claim 20, wherein said combining step comprises the steps of scaling said at least one error signal and adding the scaled at least one error signal to said different one of said color intensity signals before it is divided in said dividing step.

24. A method as in claim 23, wherein said at least one error signal comprises Green and Red error signals and said different one of said color intensity signals comprises a Blue signal, said Green error signal being scaled in said scaling step by a value approximately equal to $C_G/C_B$ and said Red error signal being scaled in said scaling step by a value approximately equal to $C_R/C_B$, where $C_G$, $C_R$ and $C_B$ are determined from the luminance equation $Y = C_G \cdot G + C_R \cdot R + C_B \cdot B$.

25. A method as in claim 24, wherein $C_G/C_B$ is approximated by 5 and $C_R/C_B$ is approximated by 2.5 in said scaling step.

* * * * *

UNITED STATES PATENT AND TRADEMARK OFFICE
CERTIFICATE OF CORRECTION

PATENT NO. : 5,170,152

DATED : 12/8/92

INVENTOR(S) : Gary L. Taylor

It is certified that error appears in the above-identified patent and that said Letters Patent is hereby corrected as shown below:

Col. 8, line 39 - "aid" to --said--

Signed and Sealed this

Twenty-ninth Day of March, 1994

Attest:

BRUCE LEHMAN

Attesting Officer    Commissioner of Patents and Trademarks